United States Patent [19]

Kikuchi

[11] Patent Number: 4,472,034
[45] Date of Patent: Sep. 18, 1984

[54] OPTICAL READ-OUT LENS SYSTEM FOR OPTICALLY RECORDED DISKS

[75] Inventor: Juro Kikuchi, Hachiooji, Japan

[73] Assignee: Olympus Optical Co., Ltd., Tokyo, Japan

[21] Appl. No.: 390,965

[22] Filed: Jun. 22, 1982

[30] Foreign Application Priority Data

Jul. 21, 1981 [JP] Japan ............... 56-112942

[51] Int. Cl.³ .................................. G02B 9/34
[52] U.S. Cl. .................................. 350/469
[58] Field of Search ............ 350/469, 483, 414, 473

[56] References Cited

U.S. PATENT DOCUMENTS 4,101,204 7/1978 Koizumi et al. .................. 350/224

FOREIGN PATENT DOCUMENTS 52-104244 9/1977 Japan .

Primary Examiner—John K. Corbin
Assistant Examiner—P. M. Dzierzynski
Attorney, Agent, or Firm—Cushman, Darby & Cushman

[57] ABSTRACT

An optical read-out lens system for optically recorded disks comprising a first, second, third and fourth lenses in which the first lens is a negative meniscus lens, the second lens is a positive lens, the third lens is a positive lens and the fourth lens is a positive meniscus lens, the optical read-out lens system being arranged that the working distance is long and offaxial aberrations are corrected favorably and, moreover, arranged to be small in size, light in weight and low in price.

4 Claims, 5 Drawing Figures

OPTICAL READ-OUT LENS SYSTEM FOR OPTICALLY RECORDED DISKS

BACKGROUND OF THE INVENTION (a) Field of the Invention

The present invention relates to an optical read-out lens system to be used with an information reading device for optically reading out the signals recorded on optically recorded disks such as digitally recorded audio disks, video disks, etc.

(b) Description of the Prior Art

For an optical read-out lens system for optically recorded disks, high resolving power is required because it is used for reading out the very small signals which are recorded with high density on a disk. Besides, a reasonably large field angle is required in order to obtain a favourable spot of light even when there is something imperfect in an automatic focusing mechanism to be used for continuously focusing the light onto the optically recorded disk, which rotates at high speed, or when there is inclination of a read-out lens caused due to tolerance in mounting accuracy of the read-out lens. Moreover, for some tracking methods, a reasonably large field angle is required in order to obtain the tracking signal.

To make the automatic focusing mechanism and tracking mechanism compact and simple, the lens system itself should be light in weight.

Furthermore, if the optical read-out lens for optically recorded disks comes into contact with the optically recorded disk, the lens and disk are broken. To prevent the above, the optical read-out lens system for optically recorded disks should have a long working distance.

For playback of optically recorded disks, monochromatic light is used generally. Therefore, to increase the signal-to-noise ratio of signals amplified after being detected by a light detector, it is preferable to use lens materials which are as transparent as possible for the light of the wavelength to be used.

Due to the reasons described in the above, for an optical read-out lens system for optically recorded disks, the number of lenses constituting the lens system should be limited to the minimum required number and lens surfaces should be provided with antireflection coatings which ensure sufficient effect.

Moreover, in these days, players for optically recorded disks are being put to practical use and it is required to make them smaller in size and lower in price. Therefore, light sources are now being switched over from He-Ne laser tubes to semiconductor lasers. This requirement for making the divices smaller in size is applied also to optical systems. To make N.A. large and to make the diameter of entrance light pencil small, optical read-out lens systems for optically recorded disks now show such tendency that the focal length is made short. On the other hand, however, it is required to keep the working distance at a reasonably large value.

SUMMARY OF THE INVENTION

It is, therefore, a primary object of the present invention to provide an optical read-out lens system for optically recorded disks for which the ratio between the working distance and focal length is large and offaxial aberrations are corrected favourably and which is small in size, light in weight and low in price.

The optical read-out lens system according to the present invention comprises a first, second, third and fourth lenses as shown in FIG. 1 wherein the first lens is a negative meniscus lens arranged to be convex toward the disk side, the second lens is a positive lens, the third lens is a positive lens and the fourth lens is a positive meniscus lens arranged to be concave toward the disk side. Besides, the optical read-out lens system according to the present invention is arranged to fulfill the following conditions:

$$0.3 < d_1/f < 1 \tag{1}$$

$$2.4 < |f_1|/f < 3.4 \tag{2}$$

$$1.2 < f_{23}/f < 2 \tag{3}$$

wherein reference symbol $f_1$ represents the focal length of the first lens, reference symbol $f_{23}$ represents the total focal length of the second and third lenses, reference symbol $f$ represents the focal length of the lens system as a whole, and reference symbol $d_1$ represents the thickness of the first lens.

The optical read-out lens system according to the present invention is arranged as a retrofocus type lens system in order to make the ratio between the working distance and focal length large.

In the lens system according to the present invention, the main function of the first lens is to put the rear principal point of the lens system as a whole to a position as far as possible close to the disk side. For this purpose, it is more preferable when the back focal point of the first lens having negative power is put to a position of as far as possible large distance from the lens group consisting of the second, third and fourth lenses and having positive power. When there exist many surfaces having negative powers, it is necessary to make the powers of surfaces having positive powers strong. In the lens system according to the present invention, a negative meniscus lens is used as the first lens so that only the first surface of the first lens has negative power and, moreover, the first lens is arranged to be convex toward the disk side so that the rear principal point of the first lens is put to a position of as far as possible large distance from the lens group consisting of the second, third and fourth lenses and having positive power.

The second, third and fourth lenses are arranged to converge the rays, which are diverged by the first lens, without causing aberrations as far as possible. For this purpose, respective surfaces of these lenses should be arranged so that they gradually converge the rays which are incident on them. Therefore, it is preferable that the second and third lenses are arranged, for example, as plano-convex lenses having the same shape and positioned to be convex toward each other. Besides, the fourth lens is arranged as positive meniscus lens positioned to be concave toward the disk side.

Now, the description below shows the reasons why the lens system according to the present invention having the above-mentioned lens configuration is arranged to fulfill the afore-mentioned respective conditions.

The condition (1) relates to the thickness of the first lens. When the thickness $d_1$ of the first lens is made large, coma becomes small, the ratio between the working distance and focal length becomes large, and astigmatic difference is reduced. When, however, $d_1$ is made too large, the lens system becomes long and large in diameter and it becomes impossible to make the lens system small in size and light in weight, i.e., it becomes impossible to attain a part of the object of the present invention. Therefore, it is not preferable to make $d_1$ as $d_1/f > 1$. On the other hand, when the thickness $d_1$ of the first lens is made small, coma occurs largely. If it becomes $0.3 > d_1/f$, coma becomes too large and, when it is attempted to correct such coma by other elements, spherical aberration occurs largely.

The condition (2) relates to the power of the first lens. To make the overall length of the lens system short by making the thickness $d_1$ of the first lens small and airspace $d_2$ between the first and second lenses also small and, at the same time, to make the ratio between the working distance and focal length large, it is necessary to make the negative power of the first lens strong. If, however, the power of the first lens is made too strong and it becomes $|f_1|/f < 2.4$, coma will be overcorrected and this is not desirable. If, on the contrary, it becomes $3.4 < |f_1|/f$, the thickness $d_1$ of the first lens and airspace $d_2$ between the first and second lenses should be made large in order to correct coma and to make the ratio between the working distance and focal length large. As a result, it becomes impossible to make the lens system small in size and light in weight.

The condition (3) is to define the total focal length of the first and second lenses. When $f_{23}/f$ defined by this condition is made small, it is also possible to make $|f_1|/f$ small. Therefore, the working distance can be made long by keeping the overall length of the lens system short. If, however, it becomes $f_{23}/f < 1.2$, spherical aberration becomes large and this is not desirable. On the other hand, when $f_{23}/f$ is made large, aberrations are reduced as a whole. If, however, it becomes $2 < f_{23}/f$, the thickness $d_1$ of the first lens or airspace $d_2$ between the first and second lenses should be made large in order to obtain a large ratio between the working distance and focal length. As a result, it becomes impossible to obtain a small-sized light-weight lens system.

DETAILED DESCRIPTION OF THE PREFERRED EMBODIMENTS

Figure 1:
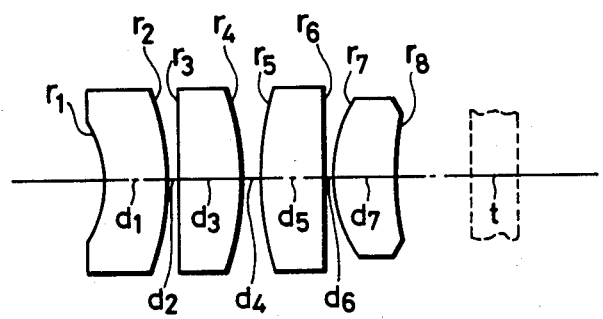
FIG. 1 shows a sectional view of the optical read-out lens system for optically recorded disks according to the present invention.

Now, preferred embodiments of the optical read-out lens system for optically recorded disks according to the present invention are shown below.

Embodiment 1
$r_1 = -1.0134$   $d_1 = 0.3822$   $n_1 = 1.57219$   $\nu_1 = 40.75$
$r_2 = -3.1082$   $d_2 = 0.0222$
$r_3 = \infty$   $d_3 = 0.3578$   $n_2 = 1.74404$   $\nu_2 = 26.52$
$r_4 = -2.0628$   $d_4 = 0.0222$
$r_5 = 2.0628$   $d_5 = 0.3578$   $n_3 = 1.74404$   $\nu_3 = 26.52$
$r_6 = \infty$   $d_6 = 0.0222$
$r_7 = 0.8949$   $d_7 = 0.34$   $n_4 = 1.76587$   $\nu_4 = 25.68$
$r_8 = 1.3536$
$f = 1, \Sigma d = 1.5044, WD = 0.816, NA = 0.45$
$t = 0.2667, n_t = 1.4886$
$|f_1|/f = 2.815, f_{23}/f = 1.392$ Embodiment 2
$r_1 = -0.8736$   $d_1 = 0.3334$   $n_1 = 1.57219$   $\nu_1 = 40.75$
$r_2 = -1.8118$   $d_2 = 0.0222$
$r_3 = \infty$   $d_3 = 0.3578$   $n_2 = 1.74404$   $\nu_2 = 26.52$
$r_4 = -2.2682$   $d_4 = 0.0222$
$r_5 = 2.2682$   $d_5 = 0.3578$   $n_3 = 1.74404$   $\nu_3 = 26.52$
$r_6 = \infty$   $d_6 = 0.0222$
$r_7 = 1.1513$   $d_7 = 0.3399$   $n_4 = 1.76587$   $\nu_4 = 25.68$
$r_8 = 2.9659$
$f = 1, \Sigma d = 1.4554, WD = 0.856, NA = 0.45$
$t = 0.2667, n_t = 1.4886$
$|f_1|/f = 3.386, f_{23}/f = 1.53$ Embodiment 3
$r_1 = -0.0981$   $d_1 = 0.3334$   $n_1 = 1.74404$   $\nu_1 = 26.52$
$r_2 = -1.7769$   $d_2 = 0.0222$
$r_3 = \infty$   $d_3 = 0.3578$   $n_2 = 1.74404$   $\nu_2 = 26.52$
$r_4 = -2.1088$   $d_4 = 0.0222$
$r_5 = 2.1088$   $d_5 = 0.3578$   $n_3 = 1.74404$   $\nu_3 = 26.52$
$r_6 = \infty$   $d_6 = 0.0222$
$r_7 = 1.0890$   $d_7 = 0.3399$   $n_4 = 1.76587$   $\nu_4 = 25.68$
$r_8 = 2.0876$
$f = 1, \Sigma d = 1.4555, WD = 0.856$
$NA = 0.5, t = 0.2778, n_t = 1.4886$
$|f_1|/f = 2.985, f_{23}/f = 1.423$ Embodiment 4
$r_1 = -0.9908$   $d_1 = 1.000$   $n_1 = 1.57219$   $\nu_1 = 40.75$
$r_2 = -2.0479$   $d_2 = 0.0222$
$r_3 = \infty$   $d_3 = 0.3579$   $n_2 = 1.74404$   $\nu_2 = 26.52$
$r_4 = -2.6885$   $d_4 = 0.0222$
$r_5 = 2.6885$   $d_5 = 0.3579$   $n_3 = 1.74404$   $\nu_3 = 26.52$
$r_6 = \infty$   $d_6 = 0.0222$
$r_7 = 0.8631$   $d_7 = 0.3402$   $n_4 = 1.76587$   $\nu_4 = 25.68$
$r_8 = 1.0103$
$f = 1, \Sigma d = 2.1226, WD = 0.944$
$NA = 0.45, t = 0.2667, n_t = 1.4886$
$|f_1|/f = 5.116, f_{23}f = 1.812$ In embodiments shown in the above, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for the light with the wavelength of 780 nm, reference symbols $\nu_1$, $\nu_2$, $\nu_3$ and $\nu_4$ respectively represent Abbe's numbers of respective lenses at d-line, reference symbol WD represents the distance to the back focal point of the lens system measured from the surface $r_8$, reference symbol t represents the thickness of the cover glass, and reference symblol $n_t$ represents the refractive index of the cover glass for the light with the wavelength of 780 nm. Here, the object point is at the infinite distance.

As it will be understood from the embodiments shown in the above, the optical read-out lens system for optically recorded disks according to the present invention is an extremely short lens system with the overall length about 1.5f and, at the same time, with a long working distance of 0.8f or more. Besides, the number of lenses constituting the lens system according to the present invention is four, and this is the same as known lens systems for optically recorded disks for which offaxial aberrations are also corrected. Moreover, compared with known lens systems for optically recorded disks for which offaxial aberrations are also corrected and which have working distances of the same degree as above, the lens system according to the present invention is much shorter in the overall length and much lighter in weight.

In Embodiments 1, 2 and 4 out of respective embodiments shown in the above, glass with a low refractive index is used for the first lens. Embodiment 2 is designed so that the overall length of the lens system becomes especially short.

In Embodiment 3, glass with a high refractive index is used for the first lens so that sufficient antireflection effect is obtained even with a single-layer coating.

In Embodiment 4, the thickness of the first lens is made large so that aberrations are corrected favourably. Therefore, the overall length of Embodiment 4 is somewhat longer than those of the other embodiments.

In respective embodiments, the surface $r_3$ of the second lens and surface $r_6$ of the third lens are arranged as planar surfaces and it is so arranged that the shape of the second lens becomes the same as the shape of the third lens. The purpose of the above-mentioned arrangements is to simplify the manufacture and to thereby provide a low-price lens system. Therefore, the surface $r_3$ and/or surface $r_6$ may be formed as surfaces other than planar surfaces and, moreover, the second and third lenses may have shapes different from each other.

Figure 2:
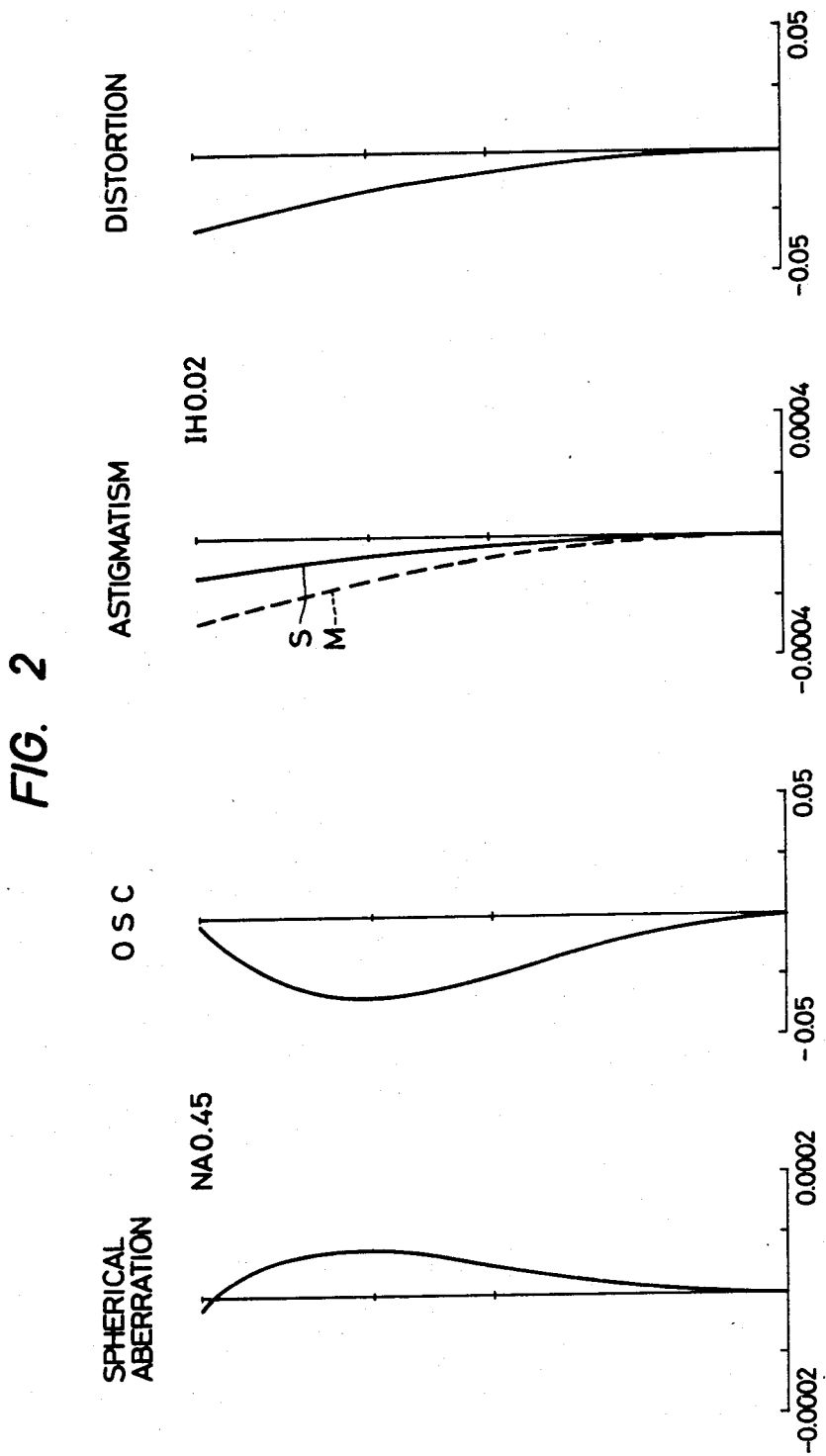
FIGS. 2 through 5 respectively show graphs illustrating aberration curves of Embodiments 1 through 4 of the present invention.
Figure 3:
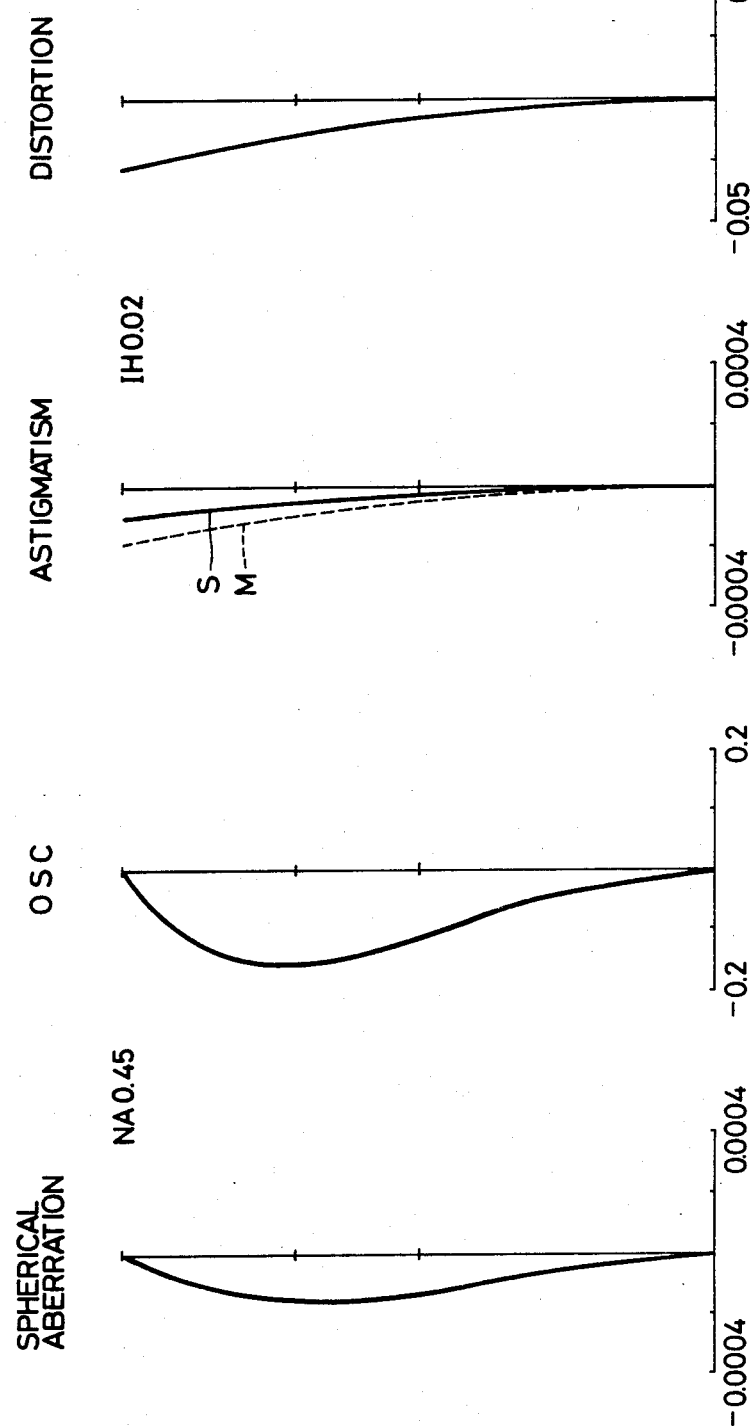
Figure 4:
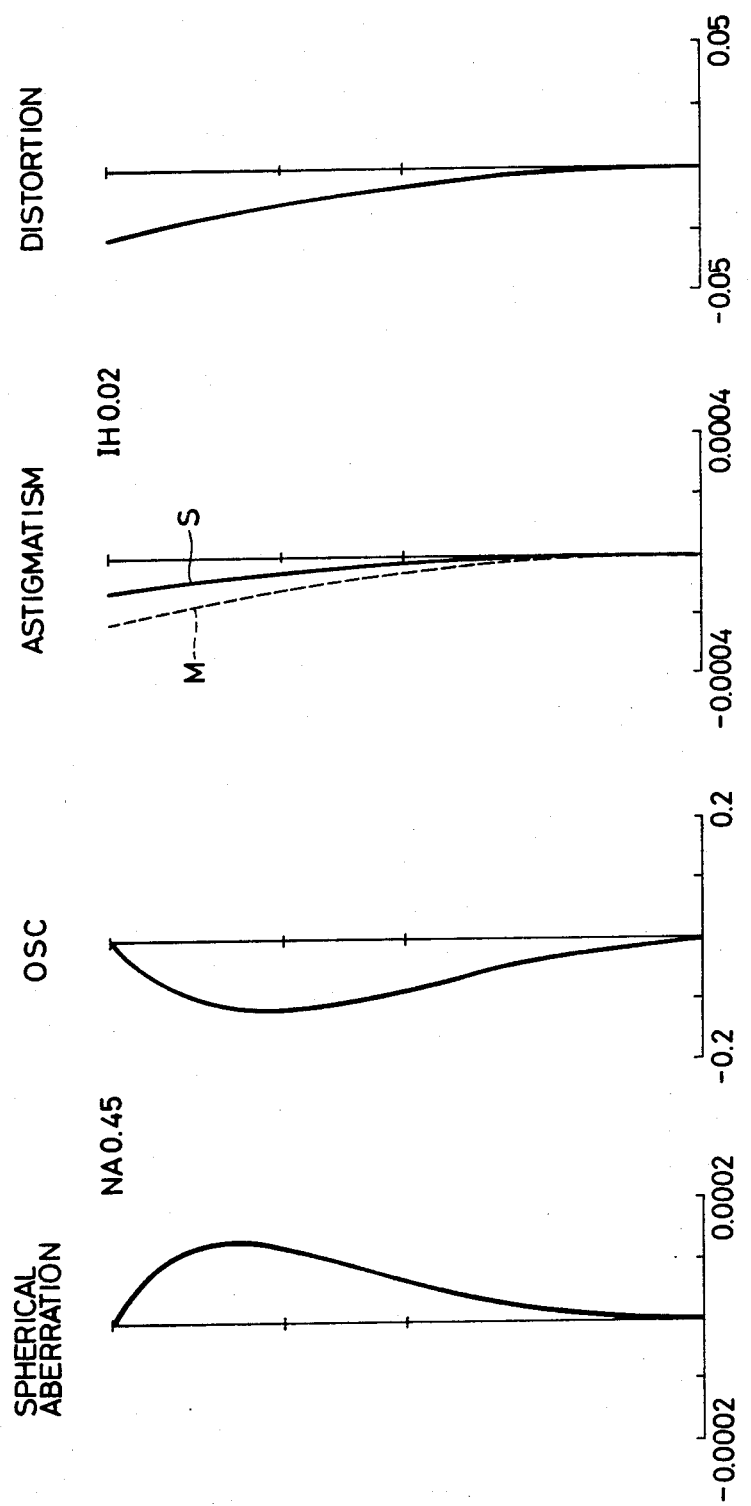
Figure 5:
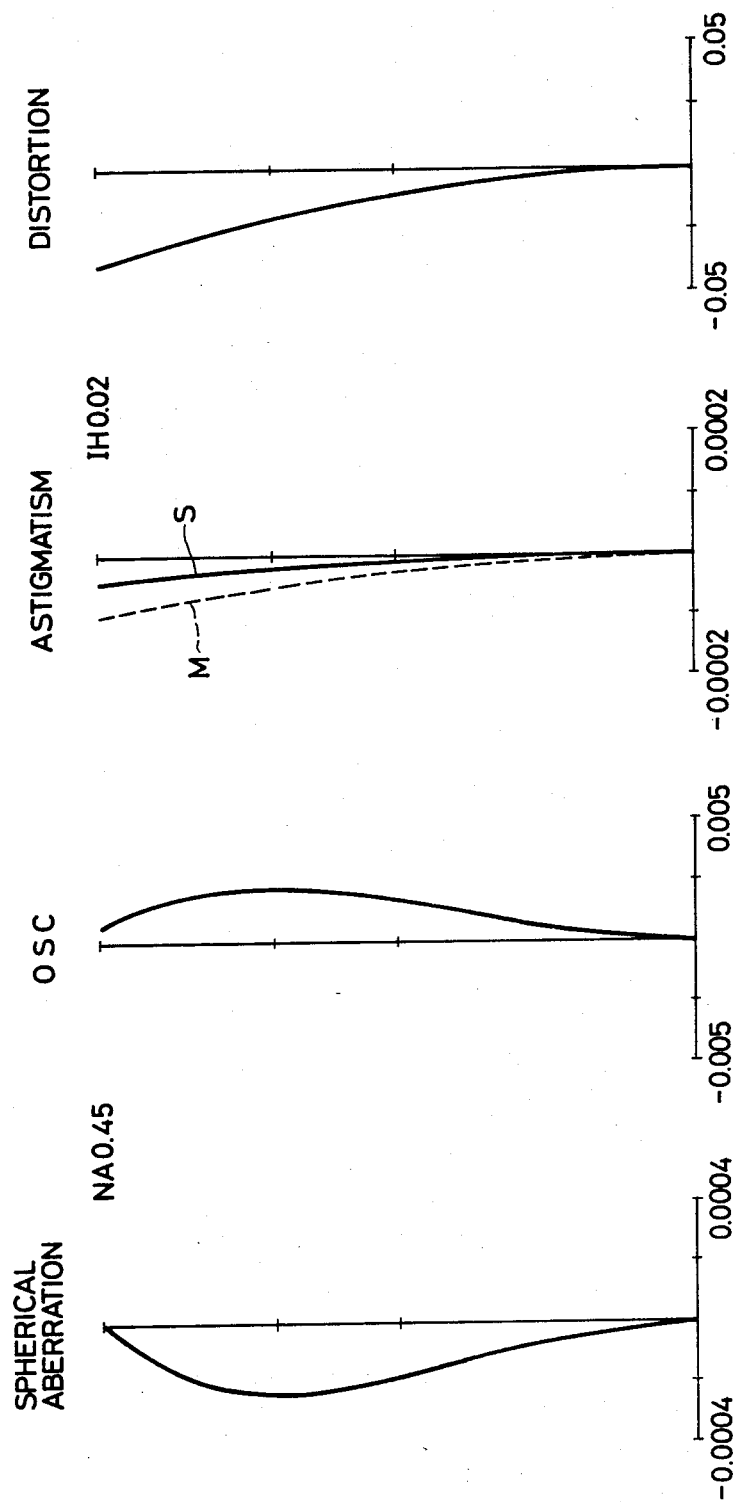

Aberration curves of respective embodiments are shown in FIGS. 2 through 5. As it is evident from these figures, aberrations of all embodiments are corrected favourably.

I claim:

1. An optical read-out lens system for optically recorded disks comprising first, second, third and fourth lenses wherein said first lens is a negative meniscus lens arranged to be convex toward the disk side, said second lens is a positive lens and said fourth lens is a positive meniscus lens arranged to be concave toward the disk side, both of said second lens and said third lens arranged as plano-convex lenses and positioned to be convex toward each other, said optical read-out lens system having the following numerical data:

| | | | |
|---|---|---|---|
| $r_1 = -1.0134$ | | | |
| | $d_1 = 0.3822$ | $n_1 = 1.57219$ | $\nu_1 = 40.75$ |
| $r_2 = -3.1082$ | | | |
| | $d_2 = 0.0222$ | | |
| $r_3 = \infty$ | | | |
| | $d_3 = 0.3578$ | $n_2 = 1.74404$ | $\nu_2 = 26.52$ |
| $r_4 = -2.0628$ | | | |
| | $d_4 = 0.0222$ | | |
| $r_5 = 2.0628$ | | | |
| | $d_5 = 0.3578$ | $n_3 = 1.74404$ | $\nu_3 = 26.52$ |
| $r_6 = \infty$ | | | |
| | $d_6 = 0.0222$ | | |
| $r_7 = 0.8949$ | | | |
| | $d_7 = 0.34$ | $n_4 = 1.76587$ | $\nu_4 = 25.68$ |
| $r_8 = 1.3536$ | | | |
| $f = 1$, | $\Sigma d = 1.5044$, | $WD = 0.816$ | |
| $NA = 0.45$, | $|f_1|/f = 2.815$, $f_{23}/f = 1.392$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for the light with the wavelength of 780 nm, reference symbols $\nu_1$, $\nu_2$, $\nu_3$ and $\nu_4$ respectively represent Abbe's numbers of respective lenses at d-line, reference symbol WD represents the distance to the back focal point of the lens system measured from the surface $r_8$, reference symbol $f_1$ represents the focal length of the first lens, reference symbol $f_{23}$ represents the total focal length of the second and third lenses, and reference symbol f represents the focal length of the lens system as a whole.

2. An optical read-out lens system for optically recorded disks comprising first, second, third and fourth lenses wherein said first lens is a negative meniscus lens arranged to be convex toward the disk side, said second lens is a positive lens and said fourth lens is a positive meniscus lens arranged to be concave toward the disk side, both of said second lens and said third lens arranged as plano-convex lenses and positioned to be convex toward each other, said optical read-out lens system having the following numerical data:

| | | | |
|---|---|---|---|
| $r_1 = -0.8736$ | $d_1 = 0.3334$ | $n_1 = 1.57219$ | $\nu_1 = 40.75$ |
| $r_2 = -1.8118$ | $d_2 = 0.0222$ | | |
| $r_3 = \infty$ | $d_3 = 0.3578$ | $n_2 = 1.74404$ | $\nu_2 = 26.52$ |
| $r_4 = -2.2682$ | $d_4 = 0.0222$ | | |
| $r_5 = 2.2682$ | $d_5 = 0.3578$ | $n_3 = 1.74404$ | $\nu_3 = 26.52$ |
| $r_6 = \infty$ | $d_6 = 0.0222$ | | |
| $r_7 = 1.1513$ | $d_7 = 0.3399$ | $n_4 = 1.76587$ | $\nu_4 = 25.68$ |
| $r_8 = 2.9659$ | | | |
| $f = 1$, $\Sigma d = 1.4554$, $WD = 0.856$ | | | |
| $NA = 0.45$, $|f_1|/f = 3.386$, $f_{23}/f = 1.53$ | | | | wherein reference symbols $r_1$ through $r_8$ respectively represent radii of curvature of respective lens surfaces, reference symbols $d_1$ through $d_7$ respectively represent thicknesses of respective lenses, reference symbols $n_1$, $n_2$, $n_3$ and $n_4$ respectively represent refractive indices of respective lenses for the light with the wavelength of 780 nm, reference symbols $\nu_1$, $\nu_2$, $\nu_3$ and $\nu_4$ respectively represent Abbe's numbers of respective lenses at d-line, reference symbol WD represents the distance to the dack focal point of the lens system measured from the surface $r_8$, reference symbol $f_1$ represents the focal length of the first lens, reference symbol $f_{23}$ represents the total focal length of the second and third lenses, and reference symbol f represents the focal length of the lens system as a whole.

3. An optical read-out lens system for optically recorded disks comprising first, second, third and fourth lenses wherein said first lens is a negative meniscus lens arranged to be convex toward the disk side, said second lens is a positive lens and said fourth lens is a positive meniscus lens arranged to be concave toward the disk side, both of said second lens and said third lens arranged as plano-convex lenses and positioned to be convex toward each other, said optical read-out lens system having the following numerical data:

| | | | |
|---|---|---|---|
| $r_1 = -0.9081$ | $d_1 = 0.3334$ | $n_1 = 1.74404$ | $\nu_1 = 26.52$ |
| $r_2 = -1.7769$ | $d_2 = 0.0222$ | | |
| $r_3 = \infty$ | $d_3 = 0.3578$ | $n_2 = 1.74404$ | $\nu_2 = 26.52$ |
| $r_4 = -2.1088$ | $d_4 = 0.0222$ | | |
| $r_5 = 2.1088$ | $d_5 = 0.3578$ | $n_3 = 1.74404$ | $\nu_3 = 26.52$ |
| $r_6 = \infty$ | $d_6 = 0.0222$ | | |
| $r_7 = 1.0890$ | $d_7 = 0.3399$ | $n_4 = 1.76587$ | $\nu_4 = 25.68$ |
| $r_8 = 2.0876$ | | | |
| $f = 1$, $\Sigma d = 1.4555$, $WD = 0.856$ | | | |
| $NA = 0.5$, $|f_1|/f = 2.985$, $f_{23}/f = 1.423$ | | | | wherein reference symbols $r_1$ through $r_8$ respectively represent radii of curvature of respective lens surfaces, reference symbols $d_1$ through $d_7$ respectively represent thicknesses of respective lenses, reference symbols $n_1$, $n_2$, $n_3$ and $n_4$ respectively represent refractive indices of respective lenses for the light with the wavelength 780 nm, reference symbols $\nu_1$, $\nu_2$ $\nu_3$ and $\nu_4$ respectively represent Abbe's numbers of respective lenses at d-line, reference symbol WD represents the distance to the back focal point of the lens system measured from the surface $r_8$, reference symbol $f_1$ represents the focal length of the first lens, reference symbol $f_{23}$ represents the total focal length of the second and third lenses, and reference symbol f represents the focal length of the lens system as a whole.

4. An optical read-out lens system for optically recorded disks comprising first, second, third and fourth lenses wherein said first lens is a negative meniscus lens arranged to be convex toward the disk side, said second lens is a positive lens, said third lens is a positive lens and said fourth lens is a positive meniscus lens arranged to be concave toward the disk side, both said second lens and said third lens being arranged as plano-convex lenses and positioned to be convex toward each other, and in which said optical read-out lens system has the following numerical data:

| | | | |
|---|---|---|---|
| $r_1 = -0.9908$ | $d_1 = 1.000$ | $n_1 = 1.57219$ | $\nu_1 = 40.75$ |
| $r_2 = -2.0479$ | $d_2 = 0.0222$ | | |
| $r_3 = \infty$ | $d_3 = 0.3579$ | $n_2 = 1.74404$ | $\nu_2 = 26.52$ |
| $r_4 = -2.6885$ | $d_4 = 0.0222$ | | |
| $r_5 = 2.6885$ | $d_5 = 0.3579$ | $n_3 = 1.74404$ | $\nu_3 = 26.52$ |
| $r_6 = \infty$ | $d_6 = 0.0222$ | | |
| $r_7 = 0.8631$ | $d_7 = 0.3402$ | $n_4 = 1.76587$ | $\nu_4 = 25.68$ |

-continued $r_8 = 1.0103$
$f = 1, \Sigma d = 2.1226, WD = 0.944$
$NA = 0.45, |f_1|/f = 5.116, f_{23}/f = 1.812$ wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for the light with the wavelength of 780 nm, reference symbols $\nu_1$, $\nu_2$, $\nu_3$ and $\nu_4$ respectively represent Abbe's numbers of respective lenses at d-line, reference symbol WD represents the distance to the back focal point of the lens system measured from the surface $r_8$, reference symbol $f_1$ represents the focal length of the first lens, reference symbol $f_{23}$ represents the total focal length of the second and third lenses, and reference symbol f represents the focal length of the lens system as a whole.

* * * * *